(12) United States Patent
Zhao et al.

(10) Patent No.: US 8,022,748 B2
(45) Date of Patent: Sep. 20, 2011

(54) POWER SOURCE CIRCUITS FOR DRIVING LIQUID CRYSTAL DISPLAYS

(75) Inventors: Chunbo Zhao, Shenzhen (CN); Yun Yang, Shenzhen (CN); Wei Feng, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 742 days.

(21) Appl. No.: 12/152,203

(22) Filed: May 12, 2008

(65) Prior Publication Data

US 2008/0291191 A1 Nov. 27, 2008

(30) Foreign Application Priority Data

May 10, 2007 (CN) .......................... 2007 1 0074403

(51) Int. Cl.
*G05F 1/10* (2006.01)
(52) U.S. Cl. ....................................................... 327/536
(58) Field of Classification Search .................. 327/535, 327/536, 537
See application file for complete search history.

(56) References Cited

U.S. PATENT DOCUMENTS

| | | | | |
|---|---|---|---|---|
| 6,798,274 | B2 * | 9/2004 | Tanimoto | 327/536 |
| 7,253,676 | B2 * | 8/2007 | Fukuda et al. | 327/536 |
| 7,403,062 | B2 * | 7/2008 | Tain | 327/536 |

* cited by examiner

*Primary Examiner* — Jeffrey Zweizig
(74) *Attorney, Agent, or Firm* — Venture Pacific Law, PC

(57) ABSTRACT

This invention is suitable for use in the field of integrated circuits. It provides a type of power source circuit. Said power source circuit includes: a charge pump circuit used to operate the charge pump to produce driving voltages; a first control circuit, used in the closed-loop control of said charge pump circuit to produce a positive high voltage; a bias-ratio circuit, used with the positive high voltage and the zero-potential voltage produced by the first control circuit to produce a positive sub-high voltage and a lowest positive high voltage; and a second control circuit, used in accordance with the positive sub-high voltage and the lowest positive high voltage produced by said bias-ratio circuit in the closed-loop control of said charge pump circuit to produce a negative high voltage. Using this invention, the system contains no voltage higher than the liquid crystal's driving voltages, and also does not contain any lower negative voltage than the liquid crystal's highest negative driving voltage, thereby reducing the circuit's electrical consumption.

20 Claims, 11 Drawing Sheets

COM Electrode Waveform

SEG Electrode Waveform

… (1)

POWER SOURCE CIRCUITS FOR DRIVING LIQUID CRYSTAL DISPLAYS

CROSS REFERENCE

This application claims priority from a Chinese patent application entitled "Power Source Circuit, Liquid Crystal Drive Unit, Liquid Crystal Display Unit, and Boost Circuit" filed on May 10, 2007, having a Chinese Application No. 200710074403.0. This Chinese application is incorporated here by reference.

FIELD OF THE INVENTION

This invention is related to power supply circuits (or power source circuits), and, in particular, to power supply circuits (or power source circuits) for driving liquid crystal displays.

BACKGROUND

Liquid crystal display screens occupy a broad market in the field of portable displays. Consumers are increasingly requiring low power consumption and high resolution in portable visual switches. The display quality of liquid crystal screens is related to the power source voltages of their liquid crystal drive units. Therefore, liquid crystal drive units must have low power consumption, and liquid crystal drive voltages should be symmetrical. Additionally, in order to broaden the practical applicability of liquid crystal drive units, there should be a wide range of options in choosing power source voltages. Liquid crystal drive units need to provide high drive voltages, so in terms of reliability, stability, and cost, power source circuits that produce high voltages are normally integrated into the liquid crystal drive units. Power source circuits include boost circuits that can achieve low electrical consumption levels by using charge pump circuits that boost voltage through the use of charge pumps along with the accompanying control circuits.

When applying DC voltages to the electrodes of a liquid crystal screen, the liquid crystal molecules' reactivity will be reduced, as will the life of the liquid crystal; therefore, AC voltage must be applied to the electrodes of the liquid crystal screen, i.e. constantly reversing voltage applied to the liquid crystal screen's electrodes. However, it must be ensured that the voltage dropouts during the periods before and after reversing are equal; that is, the consistency and symmetry of voltage changes must be ensured.

In most charge pump circuits, the produced voltage is a whole-number multiple of an externally-provided system voltage (in theory), and an appropriate liquid crystal drive voltage cannot be directly produced. A low dropout regulator (LDO) or another structure is further required to regulate the production of stable high voltage for use in driving the liquid crystal. This type of chip may contain a voltage higher than the highest liquid crystal drive voltage, thereby leading to a complex circuit structure and high power consumption. The production of the highest negative driving voltage is also normally performed by first using a charge pump circuit to produce a highest negative voltage, then using a subtractor to produce a smaller negative voltage for use as the highest negative driving voltage for the liquid crystal. Thus the existence in a chip of a negative voltage even greater than the negative liquid crystal driving voltage can also lead to circuit complexity and high energy consumption.

Therefore, it would be desirable to have a type of power source circuit aimed at resolving the problems of circuit structure complexity and high power consumption currently plaguing the generation of liquid crystal driving voltages.

SUMMARY OF THE INVENTION

An object of the present invention is to provide a type of power source circuit having low structure complexity and low power consumption for driving liquid crystal displays.

Another object of the present invention is to provide a type of liquid crystal drive unit that includes a power source circuit and a liquid crystal drive element.

Briefly, this invention provides a type of power source circuit, comprising a charge pump circuit used to operate the charge pump to produce driving voltages; a first control circuit, used in the closed-loop control of said charge pump circuit to produce a positive high voltage; a bias-ratio circuit, used with the positive high voltage and the zero-potential voltage produced by the first control circuit to produce a positive sub-high voltage and a lowest positive high voltage; and a second control circuit, used in accordance with the positive sub-high voltage and the lowest positive high voltage produced by said bias-ratio circuit in the closed-loop control of said charge pump circuit to produce a negative high voltage. Using this invention, the system contains no voltage higher than the liquid crystal's driving voltages, and also does not contain any lower negative voltage than the liquid crystal's highest negative driving voltage, thereby reducing the circuit's electrical consumption.

An advantage of the present invention is that it provides a type of power source circuit having low structure complexity and low power consumption for driving liquid crystal displays.

Another advantage of the present invention is that it provides a type of liquid crystal drive unit that includes a power source circuit and a liquid crystal drive element.

DETAILED DESCRIPTION OF THE PREFERRED EMBODIMENTS

In order to further clarify the goals, technology, and advantages of this invention, some illustrations and examples are provided below for more precise explanation. It should be understood that the descriptions provided here are only for clarification purposes, and not to limit the scope of this invention.

In the embodiments of this invention, through the control circuit's closed-loop control of the conductivity and non-conductivity of the charge pump circuit's on-off switches, by controlling the charge pump circuit, stable highest positive and highest negative liquid crystal drive voltages are directly produced. This reduces power consumption and leads to a simple, easily realized structure.

Figure 1:
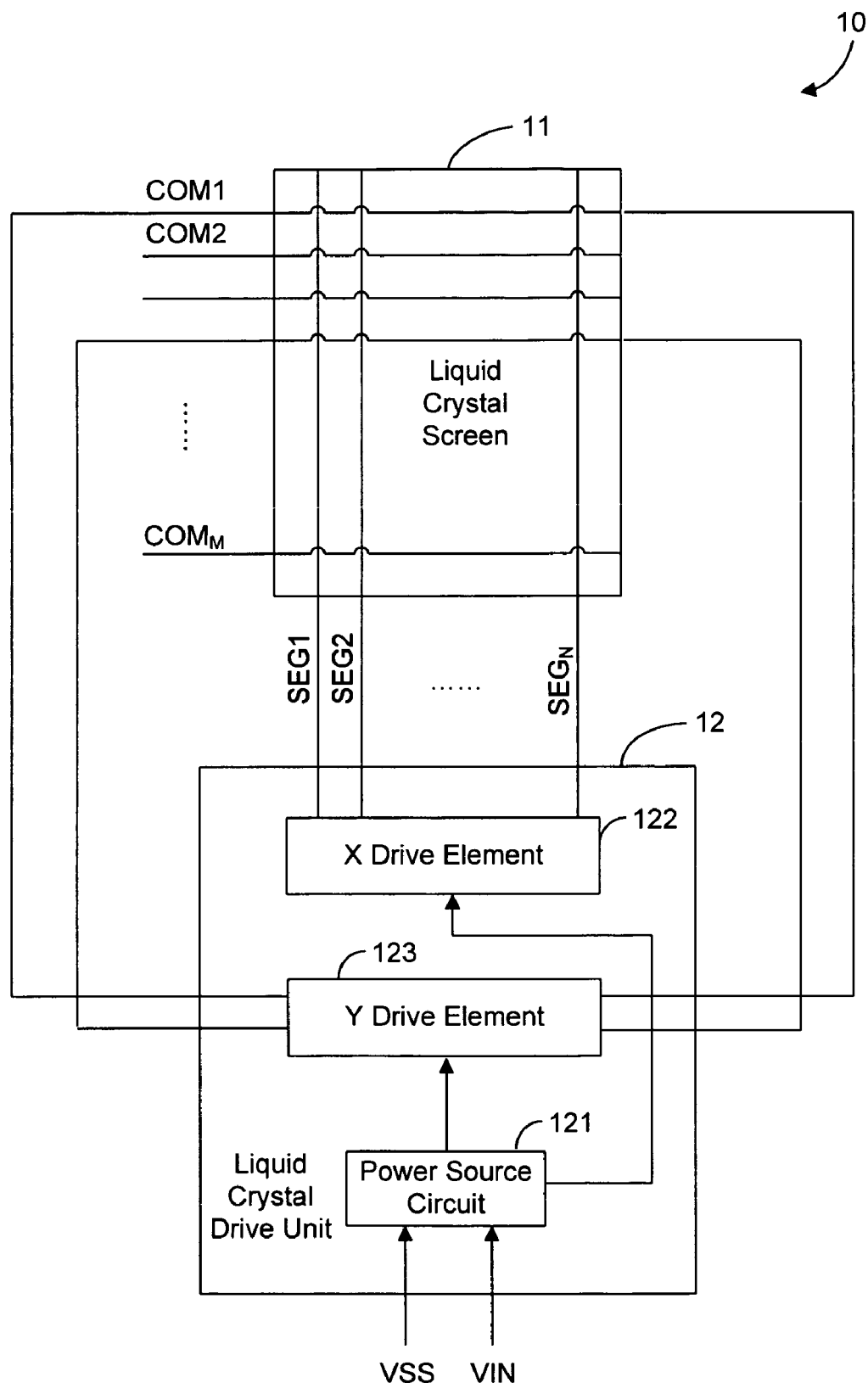
FIG. 1 contains a structural diagram of the liquid crystal display unit of the liquid crystal drive unit in the embodiments of this invention.

FIG. 1 shows a structure of the liquid crystal display unit of the liquid crystal drive unit in the embodiments of this invention. For convenience of explanation, only portions related to these embodiments are shown.

The liquid crystal display unit (10) includes the liquid crystal screen (11) and the liquid crystal drive unit (12). The liquid crystal screen (11) includes column electrodes (COM), and row electrodes (SEG). COM electrodes are also called public electrodes or scanning electrodes; SEG electrodes are also called segment electrodes or data electrodes. The number of COM electrodes and SEG electrodes varies with the size of the liquid crystal screen (11). Pixels are located at the positions corresponding to the intersection points between correlated COM electrodes and SEG electrodes. Each pixel is formed by sealing liquid crystals between COM electrodes and SEG electrodes, and their transparency varies with the voltage applied to the COM electrodes and SEG electrodes.

The pixels in the liquid crystal screen (11) can be divided into selected points, non-selected points, and semi-selected points. Pixels that are selected in both the row and column directions are selected points; pixels that are selected in neither the row nor column directions are non-selected points; and pixels that are selected in one of either the row or column directions are semi-selected points. Thus, the liquid crystal electrode voltage includes both selected voltage and non-selected voltage.

The liquid crystal drive unit (12) contains a power source circuit (121), an X drive part (122), and a Y drive part (123). The power source circuit (121) produces the SEG electrode driving voltage and COM electrode driving voltage in accordance with the externally provided zero-potential voltage (VSS) and the externally provided system power source voltage (VIN). In accordance with display data, the X drive part (122) drives the liquid crystal screen's (11) SEG electrodes $SEG_1$-$SEG_N$ using the SEG driving voltage produced by the power source circuit (121). In accordance with display data, the Y drive part (123) drives the liquid crystal screen's (11) COM electrodes $COM_1$-$COM_M$ using the COM driving voltage produced by the power source circuit (121).

Figure 2:
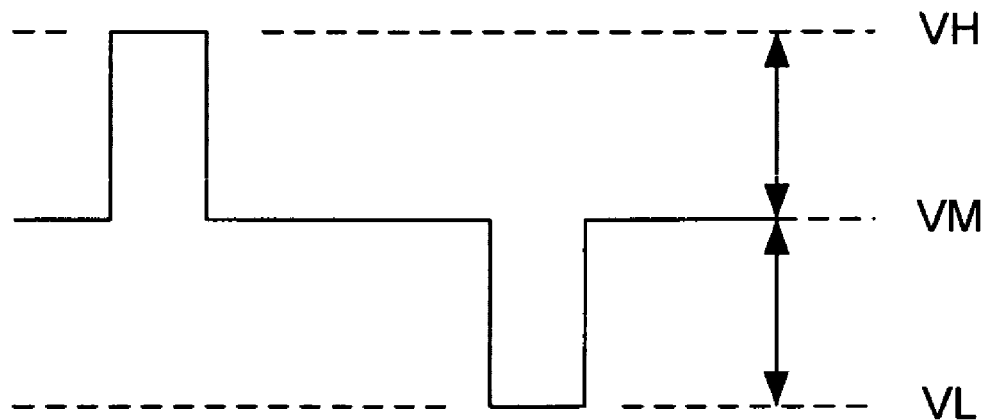
FIG. 2 is a waveform diagram of the voltages of the COM and SEG electrodes in the embodiments of this invention.
Figure 2:
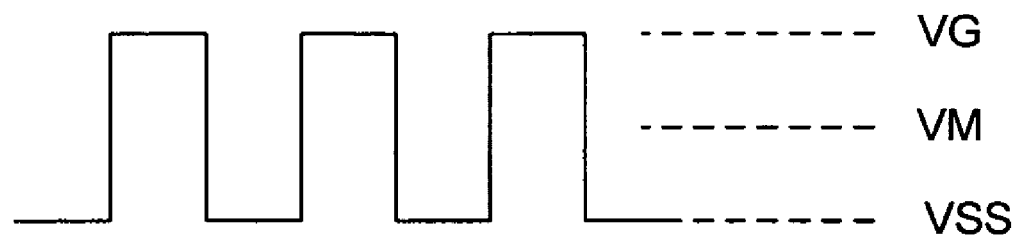

FIG. 2 shows the waveform of the voltages of the COM and SEG electrodes in the embodiments of this invention. This embodiment contains five driving voltages: a positive high voltage VH, a positive sub-high voltage VG, a lowest positive high voltage VM, a zero-potential voltage VSS, and a negative high voltage VL. The magnitude relationships between these five voltages are as follows: VH>VG>VM>VSS>VL. The positive high voltage VH and the negative high voltage VL are the most positive and the most negative liquid crystal driving voltages; the liquid crystal drive system does not contain any higher positive voltage than the highest positive driving voltage used by the liquid crystals, nor does it contain any lower negative voltage than the highest negative driving voltage used by the liquid crystals. The resistance-divided voltage between the positive high voltage VH and the zero-potential voltage VSS produces the positive sub-high voltage VG and the lowest positive high voltage VM.

VH, VL, and VM are the COM electrode voltages; VH and VL are the COM electrode selected voltages. VH is a positive high voltage, VL is a negative high voltage, and both are symmetrical with respect to VM. VM is the COM electrode non-selected voltage. VG and VSS are the SEG electrode voltages, and are also both symmetrical with respect to VM. When the COM electrode selected voltage is VH, the SEG electrode selected voltage is VSS and the non-selected voltage is VG. When the COM electrode selected voltage is VL, the SEG electrode selected voltage is VG and the non-selected voltage is VSS.

Figure 3:
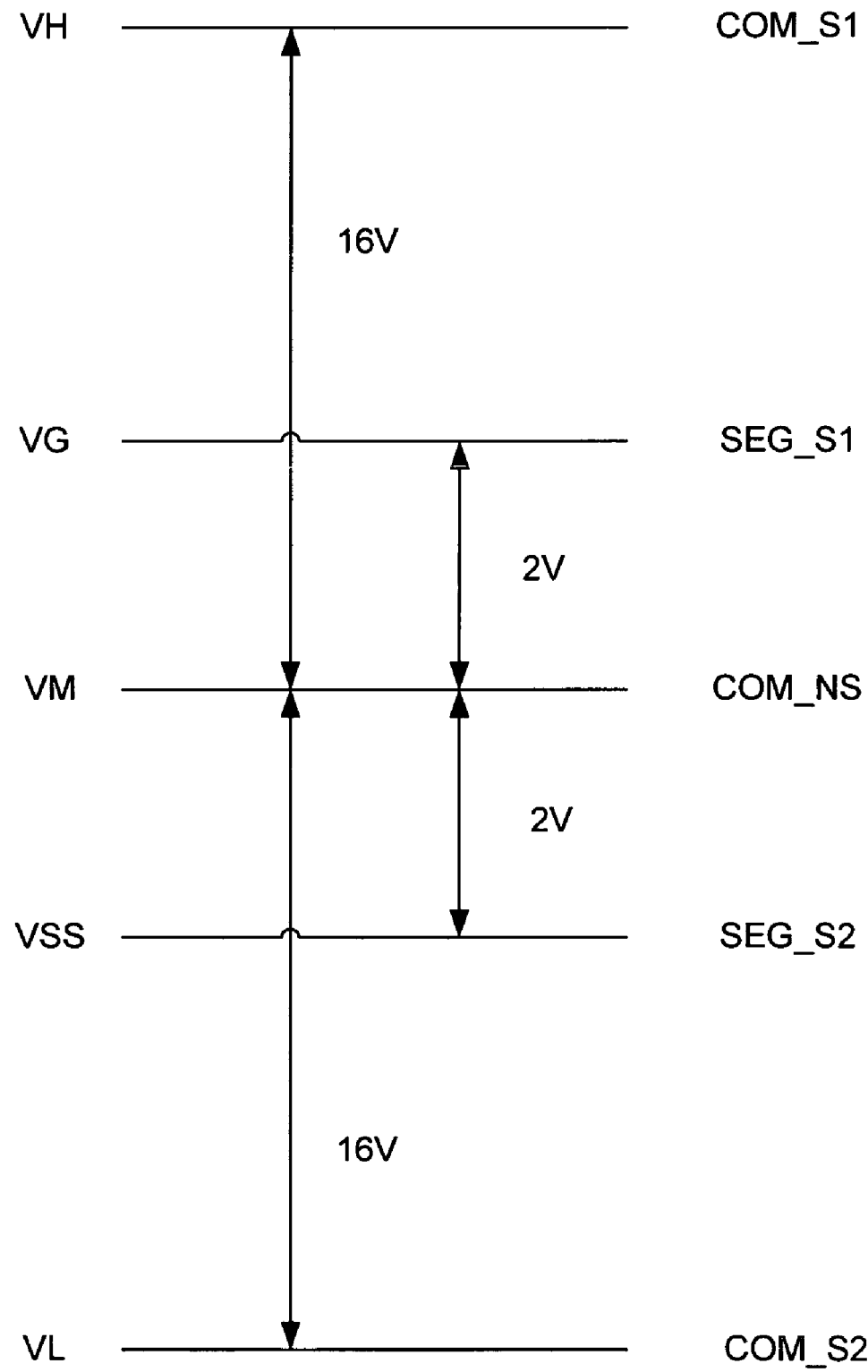
FIG. 3 is a diagram of the relationship between the driving voltages of the COM and SEG electrodes in the embodiments of this invention.

FIG. 3 shows the relationship between the driving voltages of the COM and SEG electrodes in the embodiments of this invention. VH is a positive high voltage, VL is a negative high voltage, and both are symmetrical with respect to VM; for example, the voltages between VM and VL and VM and VH are both 16V. VG and VSS are also symmetrical with respect to VM; for example the voltages between VM and VG and VM and VSS are both 2V.

In common definition, the ratio of selected voltage to non-selected voltage is the bias-ratio; accordingly, in this invention VH/VM is the bias-ratio. In order to achieve the optimal display resolution in the liquid crystal screen (11), in this invention the bias-ratio can be programmably controlled, i.e. VH, VG, VM, and VL are adjustable. At the same time, the consistency and symmetry of voltage conversions is ensured, thus resolving the contradiction between voltage adjustability and voltage consistency.

Figure 4:
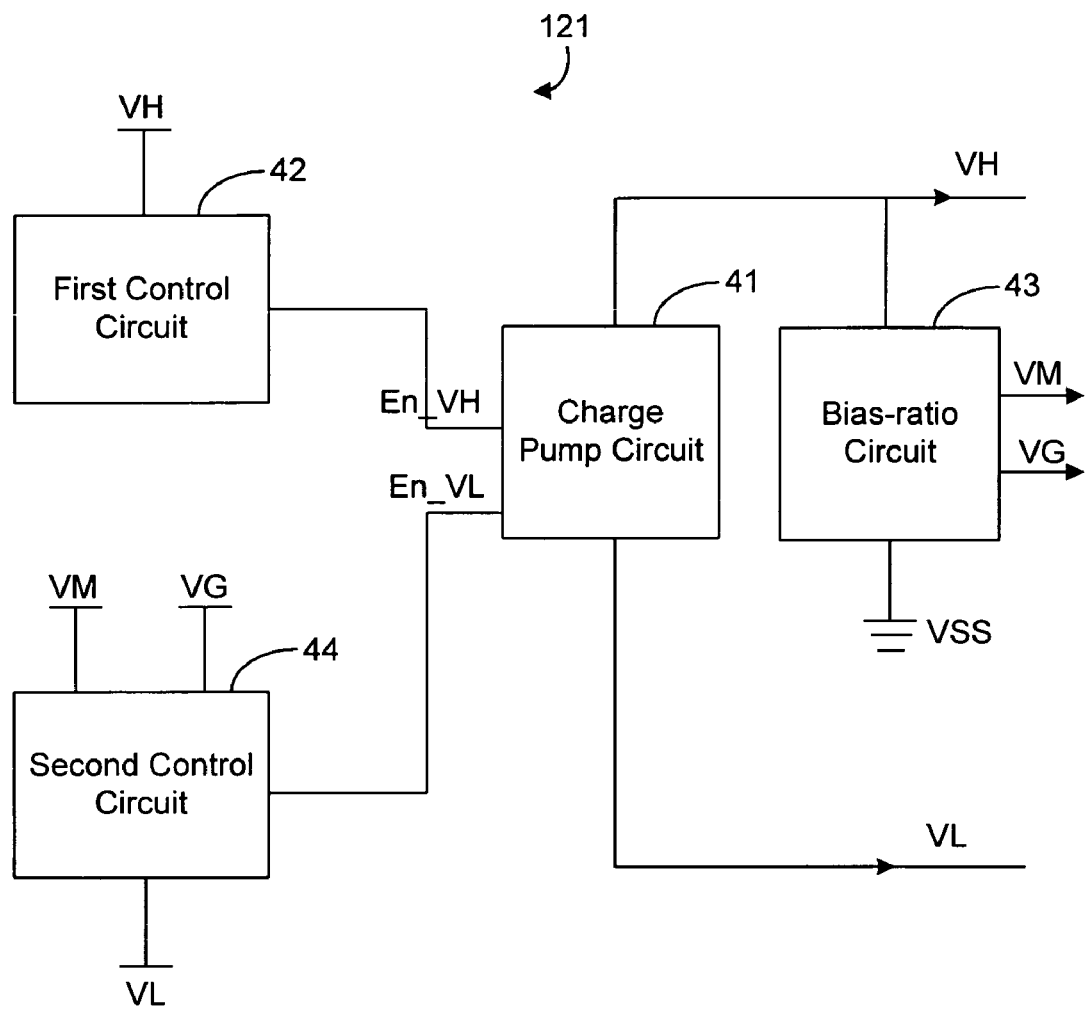
FIG. 4 is a structural diagram of the power source circuit provided by the embodiments of this invention.

FIG. 4 shows the structure of the power source circuit provided by the embodiments of this invention, including the charge pump circuit (41) that produces the liquid crystal driving voltages, and the control circuit and bias-ratio circuit (43) that through a closed-loop controls the charge pump circuit (41) to produce the driving voltages. The control circuit includes the first control circuit (42) that controls the charge pump circuit (41) through a closed-loop to produce a positive high voltage, and the second control circuit (44) that controls the charge pump (41) through a closed-loop to produce a negative high voltage.

In the embodiments of this invention, VH and VL are directly produced when the first control circuit (42) and the second control circuit (44) control the charge pump circuit (41). VG and VM are produced when VH and VSS pass through the bias-ratio circuit (43) resistance-divided voltage.

Through on-off switches, such as a metal oxide semiconductor (MOS), the charge pump circuit (41) controls the charging and discharging of the capacitor, gradually storing the capacitor's charge in another capacitor, thus boosting its voltage and producing high voltage.

In the embodiments of this invention, MOS switches used as examples to demonstrate the realization of the charge pump circuit. Of course, other on-off switches can be used to realize the charge pump circuit. In a charge pump circuit that uses MOS transistors as on-off switches, either P-channel MOS transistors or N-channel MOS transistors can be used based on the circuit requirements and according to the circuit principles demonstrated in these embodiments; these embodiments do not represent restrictions on possible circuits.

In the embodiments of this invention, the charge pump circuit (41) can be split into an N-stage (N≧2) sub-circuit in which each sub-circuit stage has the same circuit structure, and each sub-circuit stage has the same structural principle.

Herein, the first through the (N−1)th sub-circuit stages produce the positive high voltage VH, and the Nth sub-circuit stage produces the negative high voltage VL.

Each sub-circuit stage includes four MOS transistors that serve as on-off switches, one charging and discharging flying capacitor that is used to transfer charge, and one storage capacitor that is used to store charge and stabilize voltage.

In the kth (1≦k<N) sub-circuit stage of the charge pump circuit (41), the first and third MOS transistors are serially connected, and the second and fourth MOS transistors are also serially connected. One terminal (not serially connected) of the first and fourth MOS transistors receives the kth voltage; one terminal (not serially connected) of the second MOS transistor receives the zero-potential voltage VSS; one terminal (not serially connected) of the third MOS transistor is the voltage output terminal for the kth sub-circuit stage, and connects to one terminal of the storage capacitor and the first MOS transistor of the (k+1)th sub-circuit stage; the other terminal of the storage capacitor receives zero-potential voltage VSS. The first and second terminals of the flying capacitor connect to the serially connected terminals of the first and third MOS transistors and the serially connected terminals of the second and fourth MOS transistors, respectively.

Each sub-circuit stage operates in two time stages. During the first stage (T1), the first and second MOS transistors are conductive, and the third and fourth MOS transistors are non-conductive; the kth voltage (e.g. the first sub-circuit stage is the initial voltage) charges the flying capacitor, and the voltage at the flying capacitor's first terminal is higher than the voltage at its second terminal. During the second stage (T2), the third and fourth MOS transistors are conductive, and the first and second MOS transistors are non-conductive; the voltage at the flying capacitor's second terminal is increased, and because of the capacitor's transient maintenance property, the voltage at the flying capacitor's first terminal is also increased, and the charge is transferred from the flying capacitor to the storage capacitor. The first and second time stages are repeated for a sufficient amount of time, after which the storage capacitor's voltage is increased and stabilizes at a specific level, thereby achieving stable high voltage.

Figure 5:
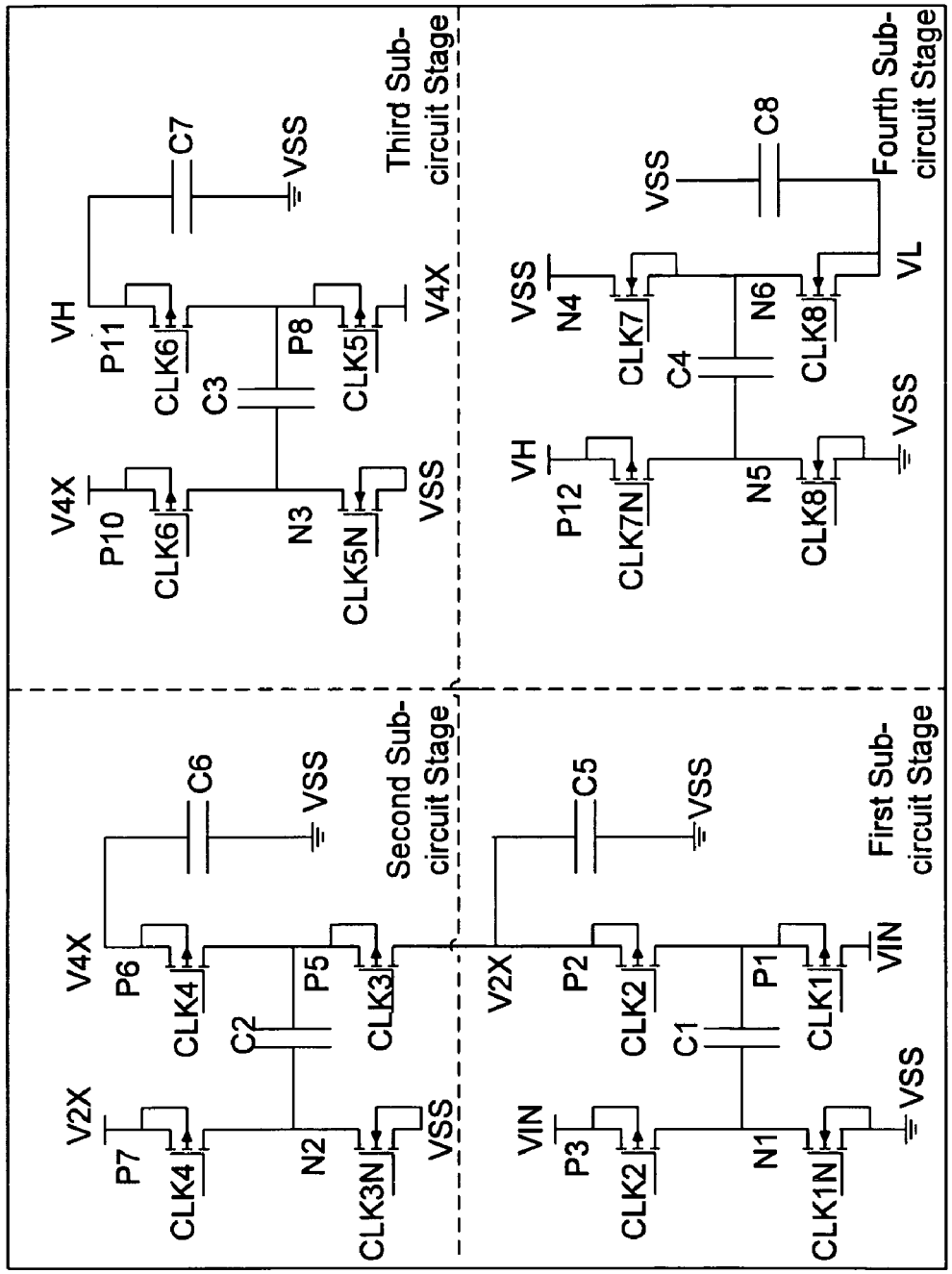
FIG. 5 is a structural diagram of the charge pump circuit provided by the embodiments of this invention.

FIG. 5 shows the structure of the charge pump circuit provided by the embodiments of this invention, including 4 sub-circuit stages, all with nearly identical structures and identical operating principles. Herein, the first control circuit (42) is the clock signal enabling terminal for the first through the third sub-circuit stages, and controls the production of positive high voltage VH; the second control circuit is the clock signal enabling terminal for the fourth sub-circuit stage, and controls the production of negative high voltage VL.

The first sub-circuit stage is used below as an illustration of the sub-circuit's specific connective structure; the other sub-circuits are similar, and are not described further.

The first, third, and fourth MOS transistors are P-channel MOS transistors (startup voltage less than zero), while the second MOS transistors is an N-channel MOS transistor (startup voltage greater than zero). The first MOS transistor (P1) and the third MOS transistor (P2) are serially connected, and the second MOS transistor (N1) and fourth MOS transistor (P3) are also serially connected. The serially connected terminals of the first and third MOS transistors (P1, P2) connect to the first terminal of the flying capacitor (C1); the serially connected terminals of the second and fourth MOS transistors (N1, P3) are connected to the second terminal of the flying capacitor (C1).

The first MOS transistor's (P1) drain connects to the third MOS transistor's (P2) source, its gate receives the clock signal CLK1, and its source receives externally provided system power source voltage VIN. The second MOS transistor's (N1) drain connects to the fourth MOS transistor's (P3) source, its gate receives clock signal CLK1N, and its source receives the zero-potential voltage VSS. The third MOS transistor's (P2) gate receives clock signal CLK2, its drain connects to the first terminal of the second sub-circuit stage's storage capacitor (C5) and the source of the second sub-circuit stage's first MOS transistor (P5), and its storage capacitor's (C5) second terminal receives zero-potential voltage VSS. The fourth MOS transistor's (P3) gate receives clock signal CLK2, and its drain receives externally provided system power source voltage VIN.

Figure 6:
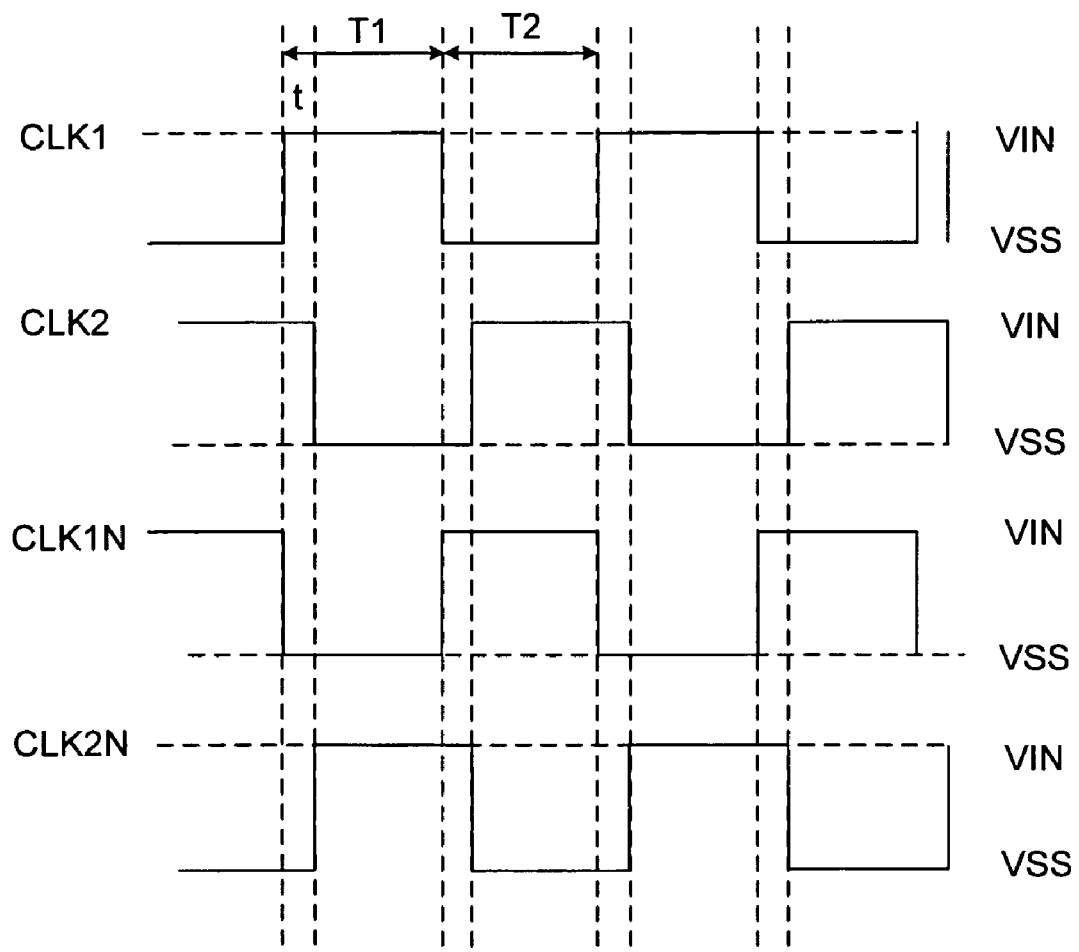
FIG. 6 is a waveform diagram of the charge pump circuit's reference time sequences provided by the embodiments of this invention.

FIG. 6 shows the waveform of the charge pump circuit's reference time sequence provided by the embodiments of this invention. CLK1 and CLK2 are non-overlapping clocks; the clocks' non-overlapping time (t) is greater than zero. CLK1N and CLK2N are the reverse clocks of CLK1 and CLK2, respectively. The voltage ranges of CLK1, CLK2, CLK1N, and CLK2N are all from the system's zero-potential voltage VSS to initial voltage VIN, and all are correspondingly separated into a first stage (T1) and a second stage (T2), wherein the first stage (T1) and second stage (T2) continually alternate back and forth.

The time sequence of every sub-circuit stage of the charge pump circuit (41) is produced from the reference time sequence. The voltage range of the reference time sequence is from the system's zero-potential voltage VSS to initial voltage VIN, and thus a level shifter must be used to convert the reference voltage to the conductive and non-conductive voltage required by the MOS switches in each sub-circuit stage of the charge pump circuit (41).

Figure 7:
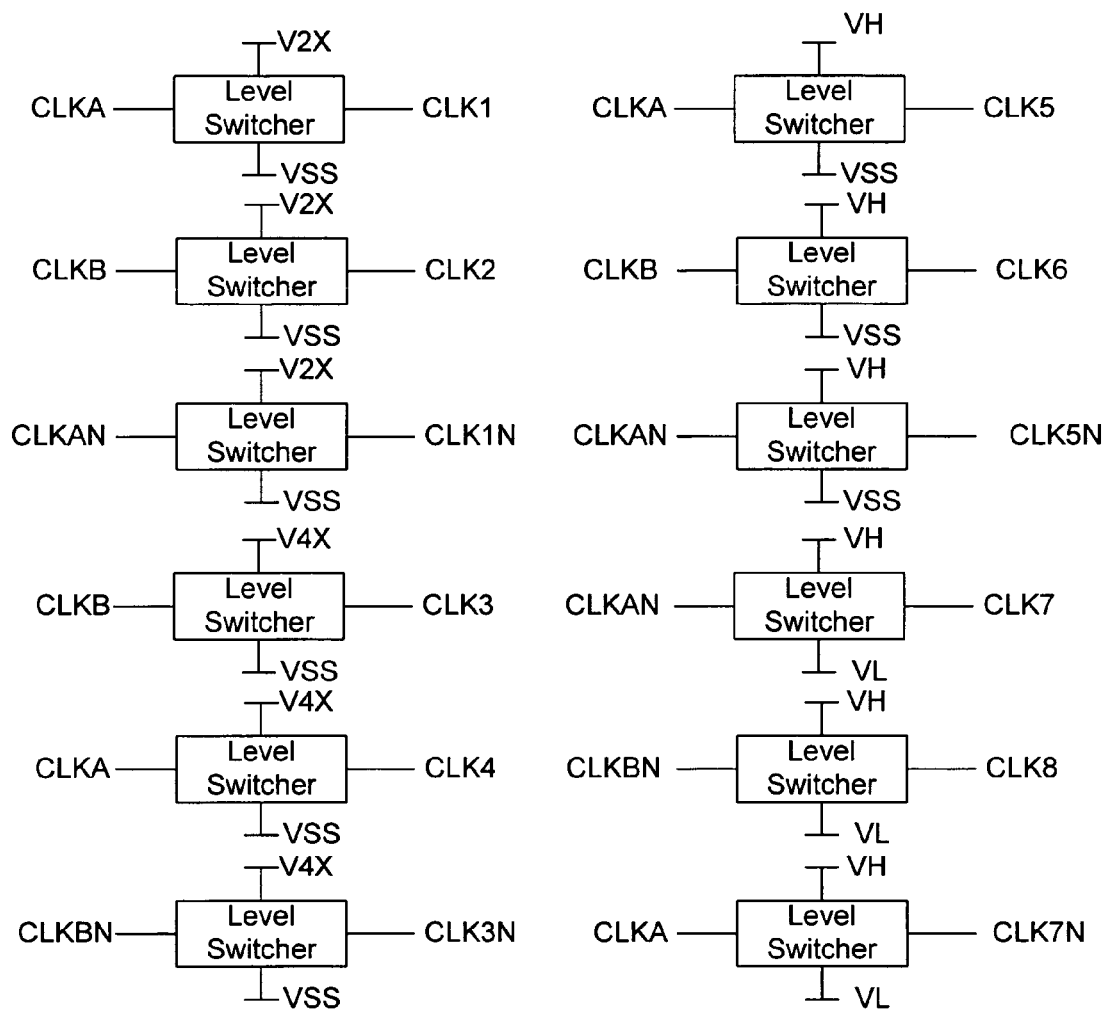
FIG. 7 is a diagram of the relationships between and production sequences of the various stages of the charge pump circuit provided by the embodiments of this invention.

As shown in FIG. 7, after using a level shifter to shift the power sources of CLKA, CLKB, and CLKAN from the zero-potential voltage VSS to the second voltage V2X, CLK1, CLK2, and CLK1N are obtained, respectively; after shifting the power sources of CLKB, CLKA, and CLKBN from zero-potential voltage VSS to the third voltage V4X, CLK3, CLK4, and CLK3N are obtained, respectively; after shifting the power sources of CLKA, CLKB, and CLKAN from zero-potential voltage VSS to the positive high voltage VH, CLK5, CLK6, and CLK5N are obtained, respectively; after shifting the power sources of CLKAN, CLKBN, and CLKA from high negative voltage VL to the positive high voltage VH, CLK7, CLK8, and CLK7N are obtained, respectively.

Looking at FIG. 5, in the first sub-circuit stage, during the first time stage (T1), the first and second MOS transistors (P1, N1) are conductive, while the third and fourth (P2, P3) are non-conductive. Initial voltage VIN charges the flying capacitor (C1), and the voltage at the first terminal of the flying capacitor (C1) is higher than the voltage at the second terminal. Afterwards, when the clock switches to the second time stage (T2), the third and fourth MOS transistors (P2, P3) are conductive, while the first and second MOS transistors (P1, N1) are non-conductive. At this time, the flying capacitor (C1) is serially connected to the storage capacitor (C5), and charge is redistributed. Because initial voltage VIN increases the voltage at the flying capacitor's (C1) second terminal, the flying capacitor (C1) will discharge into the storage capacitor (C5); after this process has been repeated for a sufficient amount of time, the voltage in the storage capacitor (C5) stabilizes at a level of VIN*2 (under ideal conditions with no load consumption), and thus second voltage V2X, which is higher than initial voltage VIN, is obtained.

By the same principle, by using the second voltage (V2X) obtained from the first sub-circuit stage as the input voltage for the second sub-circuit stage, a third voltage (V4X) can be obtained; and by using third voltage V4X as the input voltage for the third sub-circuit stage, positive high voltage VH can be obtained.

The negative high voltage VL is obtained through the fourth sub-circuit stage. During the first stage (T1), MOS switches P12 and N4 are conductive, N5 and N6 are non-conductive, the positive high voltage VH charges the flying capacitor C4, and the voltage at the first terminal of flying capacitor C4 is higher than the voltage at the second terminal. Afterwards, when the clock switches to the second stage (T2), MOS switches N5 and N6 are conductive, and P12 and N4 are non-conductive; at this time, flying capacitor C4 is serially connected to storage capacitor C8, and charge is redistributed. Because VSS decreases the voltage at the first terminal of flying capacitor C4, the voltage at the first terminal of storage capacitor C8 is also decreased and the charges of flying capacitor C4 and storage capacitor C8 are redistributed. Once this process has been repeated for a sufficient amount of time, the voltage in storage capacitor C8 stabilizes at the level of positive high voltage VH (under ideal conditions with no load consumption).

Figure 8:
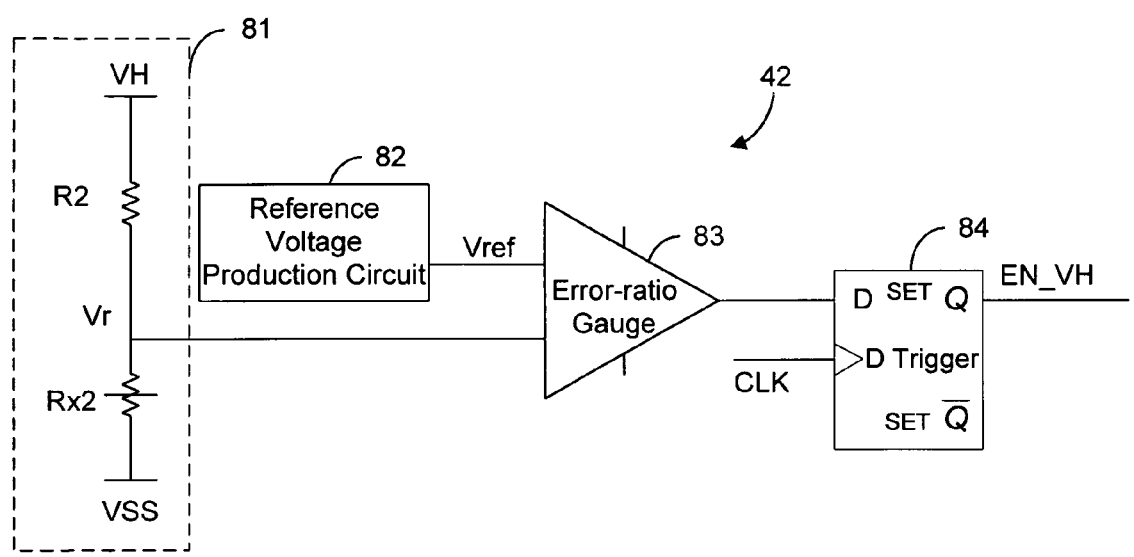
FIG. 8 is a structural diagram of the first control circuit provided by the embodiments of this invention.

FIG. 8 shows the structure of the first control circuit provided by the embodiments of this invention, including the resistance voltage division circuit (81) between positive high voltage VH and the zero-potential voltage VSS, the reference voltage production circuit (82), the error-ratio gauge (83) and the D trigger sampling circuit (84).

The resistance voltage division circuit (81) produces divided voltage Vr through the resistance-divided voltage between positive high voltage VH and the zero-potential voltage VSS; the reference voltage production circuit (82) produces the reference voltage Vref through a bandgap reference circuit, and inputs Vref and Vr into the non-inverting and inverting input terminals of the error-ratio gauge (83), respectively. The error-ratio gauge's (83) output enabling trigger signal is input into the data terminal of the D trigger sampling circuit (84), and, after the charge pump circuit (41) sampling the clock enabling signal, becomes the clock enabling terminal for the first through third sub-circuit stages of the charge pump circuit (41).

The relative voltages of the first control circuit (42) can be expressed with the following formula:

$$VH*Rx2/(R2+Rx2)=Vr=Vref;$$

or in another form: $VH=Vref*(R2+Rx2)/Rx2$.

When positive high voltage VH is lower than Vref*(R2+Rx2)/Rx2, the voltage at the error-ratio gauge's (83) non-inverting terminal is greater than the voltage at its inverting terminal, and the enabling trigger signal output by the error-ratio gauge (83) is high. The D trigger sampling circuit (84) outputs valid positive high voltage clock enabling signal EN_VH to the clock enabling terminals of the charge pump circuit's (41) first through third sub-circuit stages. The charge pump circuit's (41) clock starts up and performs charging and discharging, charge is continually added to the storage capacitor, and VH is thus increased.

When the positive high voltage VH is greater than or equal to Vref*(R2+Rx2)/Rx2, the voltage at the error-ratio gauge's (83) non-inverting terminal is less than the voltage at its inverting terminal, and the enabling trigger signal output by the error-ratio gauge (83) is low. The D trigger sampling circuit (84) outputs an invalid clock enabling signal, the charge pump circuit shuts down, charging and discharging are not performed, charge is no longer added to the storage capacitor, and the voltage stabilizes at Vref*(R2+Rx2)/Rx2.

When load consumption charge causes positive high voltage VH to be lower than Vref*(R2+Rx2)/Rx2, the charge pump circuit (41) starts up again, charge is once again added to the storage capacitor, and through adjustment of Vref, R2 and Rx2 can adjust the magnitude of positive high voltage VH.

Figure 9:
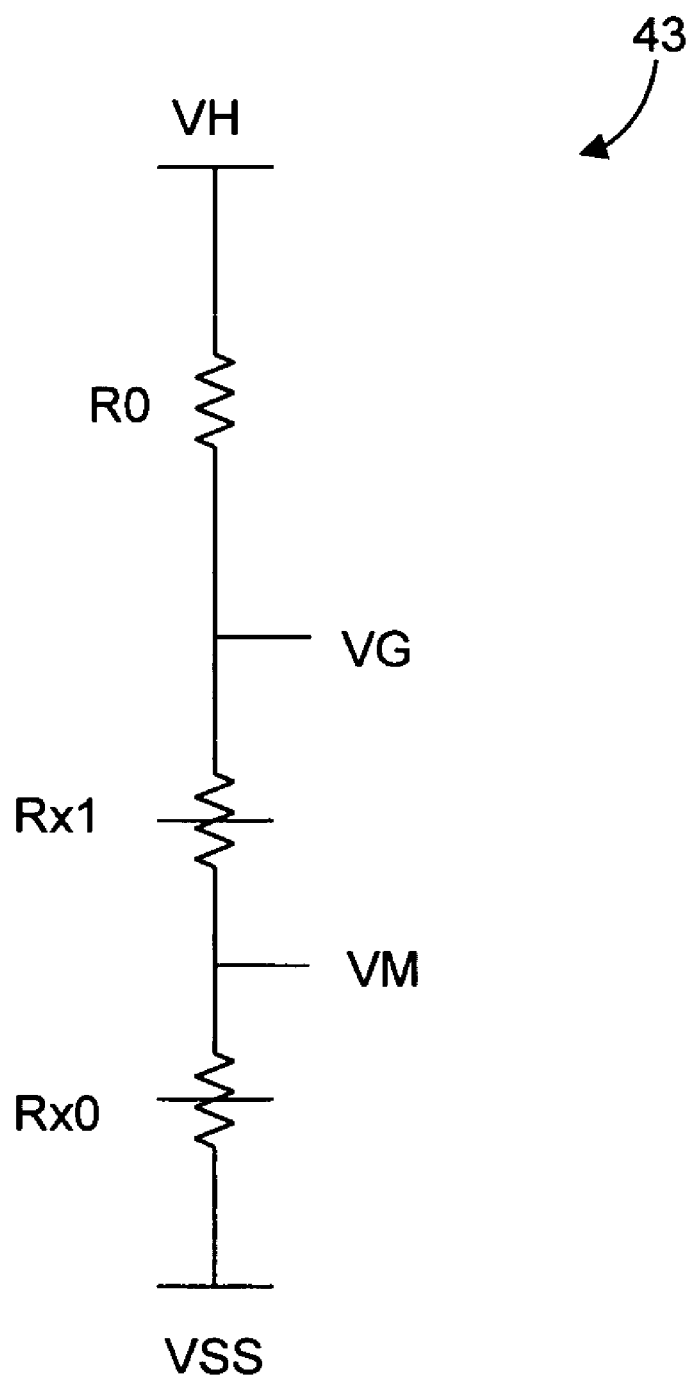
FIG. 9 is a structural diagram of the bias-ratio circuit provided by the embodiments of this invention.

FIG. 9 shows the structure of the bias-ratio circuit provided by the embodiments of this invention. In the bias-ratio circuit (43), resistors R0, Rx1, and Rx0 are serially connected between the positive high voltage VH and the zero-potential voltage VSS. One terminal of resistor R0 connects to the positive high voltage (VH) output terminal of the charge pump circuit (41); the other end connects to Rx1, while the other terminal of Rx1 connects to resistor R0, and the other terminal of resistor R0 receives the zero-potential voltage VSS. VG is output at the connected terminal of R0 and Rx1, and VM is output at the connected terminal of Rx1 and Rx0.

Because VG and VSS are symmetrical with respect VM, the resistance of resistors Rx1 and Rx0 are equal, and vary identically. The relative voltages between VH and VG and VM can be expressed with the following formula:

$$VG=VH*(Rx1+Rx0)/(R0+Rx1+Rx0);$$

$$VM=VH*Rx0/(R0+Rx1+Rx0);$$

or alternatively as:

$$VH=VM*(R0+Rx1+Rx0)/Rx0=VM+[VM*(R0+Rx1)/Rx0].$$

In accordance with the unique characteristics of the liquid crystal screen (11), the bias-ratio can be programmably controlled; through the logic control method used to adjust the resistances of resistors Rx0 and Rx1, bias-ratio VH/VM and voltages VM and VG can also be adjusted.

Figure 10:
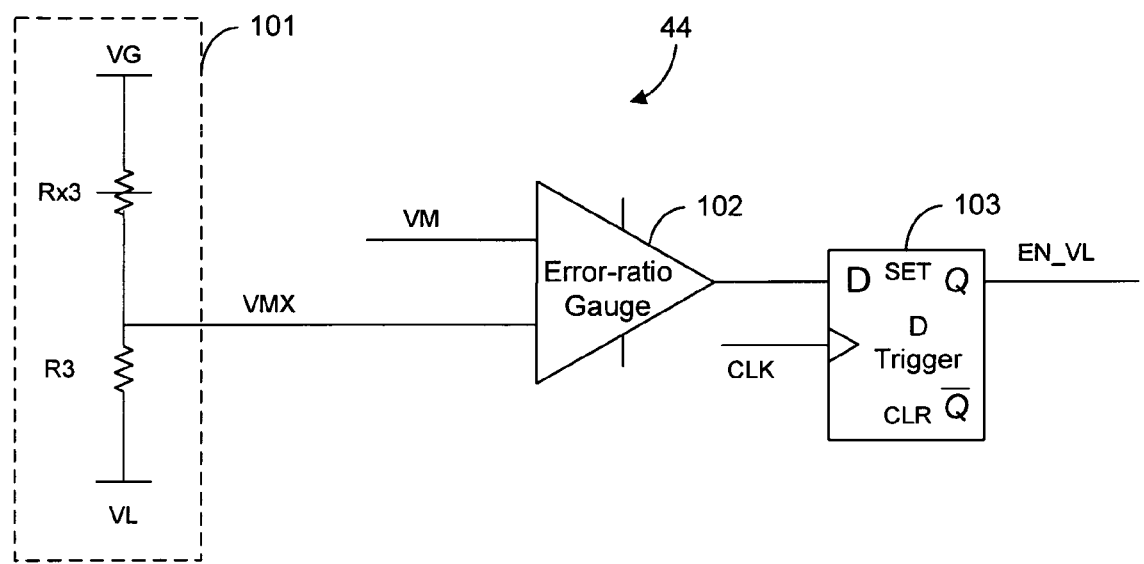
FIG. 10 is a structural diagram of the second control circuit provided by the embodiments of this invention.

FIG. 10 shows the structure of the second control circuit provided by the embodiments of this invention, including the resistance voltage division circuit (101), the error-ratio gauge (102), and the D trigger sampling circuit (103).

In the resistance voltage division circuit (101) resistors Rx3 and R3 are serially connected, the terminal of resistor Rx3 that is not serially connected connects to the positive sub-high voltage (VG) output terminal of the bias-ratio circuit (43), the terminal of resistor R3 that is not serially connected receives the negative high voltage VL, and the connected terminal of resistors Rx3 and R3 outputs voltage VMX. Voltage VMX and VM are input into the non-inverting and inverting input terminals of the error-ratio gauge (102), respectively. The enabling trigger signal output by the error-ratio gauge (102) is input into the data terminal of the D trigger sampling circuit (103), and, after the charge pump circuit (41) sampling the clock enabling signal, becomes the clock enabling terminal for the fourth sub-circuit stage of the charge pump circuit (41).

The voltage VMX produced by voltage splitting by the resistance voltage division circuit (101) and the voltage VM produced by the bias-ratio circuit (43) are input into the non-inverting and inverting input terminals of the error-ratio gauge (102). The error-ratio gauge (102) compares said voltages VMX and VM, the enabling trigger signal that it outputs is input into the data terminal of the D trigger sampling circuit (103), and after going through sampling by the D trigger sampling circuit (103) it serves as the sequence enabling signal EN_VL for the charge pump circuit's (41) negative high voltage production circuit, thereby controlling the conductivity and non-conductivity of this portion of MOS switches, and thus controlling the magnitude of the negative high voltage (VL).

When VMX>VM, the voltage at the error-ratio gauge's (102) non-inverting terminal is greater than the voltage at its inverting terminal, the output enabling trigger signal is high, the D trigger sampling circuit (103) outputs a valid clock enabling signal that serves as the sequence enabling signal EN_VL for the charge pump circuit's (41) negative high voltage production circuit, the charge pump circuit's (41) clock starts up, and charging and discharging are performed.

When VMX≧VM, the voltage at the error-ratio gauge's (102) non-inverting terminal is less than the voltage at its inverting terminal, the output enabling signal is low, the D trigger sampling circuit (103) outputs an invalid clock enabling signal, the charge pump circuit (41) shuts down, and charging and discharging are not performed.

VM and VMX are equal voltages (in theory they are equal, but in practice there may exist a small discrepancy between them). From the symmetrical relationships we know that VG−VL=VH and VG=2*VM. bThus the relative voltages of VL and VM and VG can be expressed with the following formula:

$$VG-VL=VM*(R3+Rx3)/R3;$$

or alternatively as:

$$VL=VM-[VM*R3/Rx3].$$

In order that VH and VL be accurately symmetrical with respect to VM, in the embodiments of this invention, Rx3=Rx0 (the resistor in bias-ratio circuit 43), and R3=R0+Rx1 (the resistor in bias-ratio circuit 43). Rx3 and Rx0 are adjusted using the same logic control to ensure the consistency of variations in VL and VH.

Figure 11:
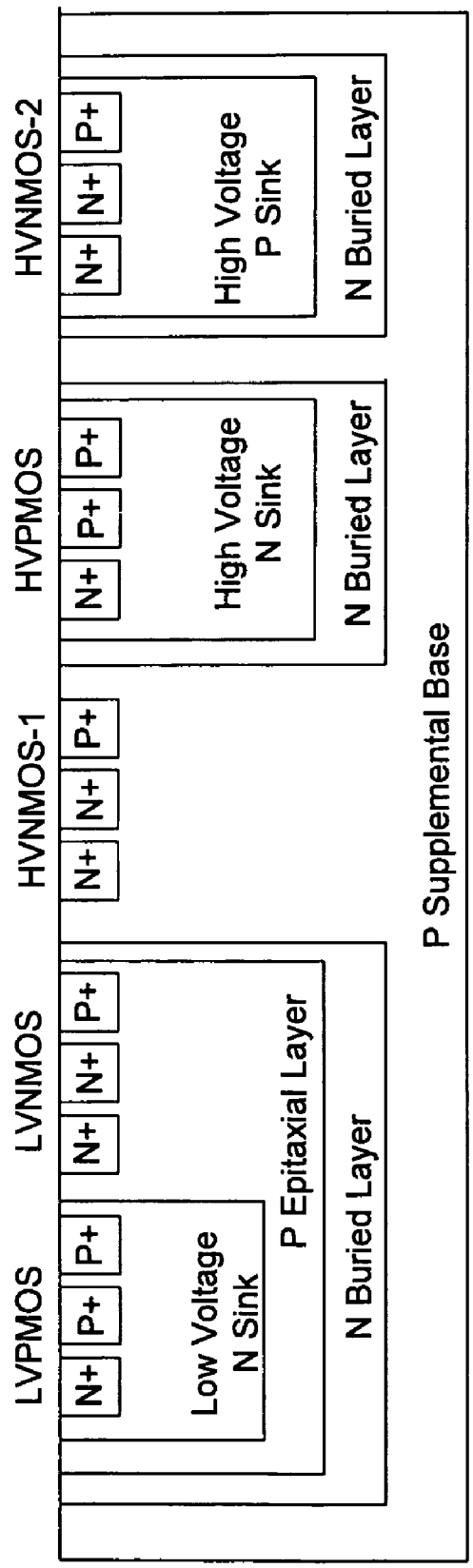
FIG. 11 is a technological cross-section drawing of the MOS switches that make up the N channel and P channel provided by the embodiments of this invention.

In the embodiments of this invention, MOS transistors can be created in the semiconductor creation process of FIG. 11; both high and low voltage MOS elements can be created. In the embodiments of this invention, MOS transistor N1 in the charge pump circuit is a low voltage N-channel MOS transistor (LVNMOS), MOS transistors N2, N3, N4, and N5 are high voltage N-channel MOS transistors (HVNMOS-2), and MOS transistor N6 is a high voltages N-channel MOS transistor (HVNMOS-1). MOS transistors P1, P2, and P3 are low voltage P-channel MOS transistors (LVPMOS), MOS transistors P4, P5, P6, P7, P8, P9, P11, and P12 are high voltage P-channel MOS transistors (HVPMOS). Other logic circuits can be created using low voltage MOS elements.

In the embodiments of this invention, the control circuit controls the length of time of conductivity and non-conductivity of the charge pump circuit's on-off switches, and thus controls the amount of charge transferred to the storage capacitor. In this way stable positive and negative voltage are obtained. Through the control circuit's closed-loop control of the charge pump circuit, the highest positive and highest negative liquid crystal driving voltages are directly produced. The system does not contain any voltage higher than the liquid crystal driving voltages, nor does it contain any voltage lower than the highest negative liquid crystal drive voltage, thereby reducing power consumption, and leading to a simple, easily realized structure.

In addition, the resistance of the resistors and the logic control in the voltage division circuit in the second control circuit in the embodiments of this invention are exactly equal to those of the bias-ratio circuit. This guarantees consistency between changes in the bias-ratio circuit and changes in the negative voltage, and also guarantees excellent consistency and symmetry in changes in the liquid crystal driving voltage.

It is clear that the method provided by the embodiments of this invention of using a control circuit to exert closed-loop control on a charge pump circuit, and of controlling the charge pump to create high voltage in accordance with a voltage provided by an external system can be used in any application that produces high voltage through a charge pump circuit. By using a control circuit to exert closed-loop control on the charge pump, any voltage, including whole-number multiples of an externally provided voltage can be flexibly produced; while maintaining the circuit's low power consumption, this simple, easily created circuit increases the range of voltages that can be produced with a charge pump circuit.

Thus, certain embodiments of this invention are created in this way, with a type of power source circuit, wherein said power source circuit includes:

a charge pump circuit, used in operating the charge pump to produce driving voltages; said driving voltages include a positive high voltage, a positive sub-high voltage, a lowest positive high voltage, a zero-potential voltage, and a negative high voltage. Said positive high voltage and said negative high voltage, as well as said positive sub-high voltage and said zero-potential voltage are respectively symmetrical with respect to said lowest positive high voltage;

a first control circuit, used in the closed-loop control of said charge pump circuit to produce said positive high voltage;

a bias-ratio circuit used in accordance with the positive high voltage and the zero-potential voltage produced by said first control circuit to produce said positive sub-high voltage and said lowest positive high voltage; and a second control circuit, used in accordance with the positive sub-high voltage and lowest positive high voltage produced by said bias-ratio circuit in the closed-loop control of said charge pump circuit to produce said negative high voltage.

Certain other embodiments of this invention is to provide a type of liquid crystal drive unit that includes a power source circuit and a liquid crystal drive element; said power source circuit produces the liquid crystal driving voltages used by said liquid crystal drive element, and said power source circuit includes:

a charge pump circuit, used in employing the operation of the charge pump to produce driving voltages. Said driving voltages include a positive high voltage, a positive sub-high voltage, a lowest positive high voltage, a zero-potential voltage, and a negative high voltage. Said positive high voltage and said negative high voltage, as well as said positive sub-high voltage and the zero-potential voltage are symmetrical with respect to said lowest positive high voltage;

a first control circuit, used in the closed-loop control of said of said charge pump circuit to produce said positive high voltage;

a bias-ratio circuit used in accordance with the positive high voltage and the zero-potential voltage produced by said first control circuit to produce said positive sub-high voltage and said lowest positive high voltage; and a second control circuit, used in accordance with the positive sub-high voltage and the lowest positive high voltage produced by said bias-ratio circuit in the closed-loop control of said charge pump circuit to produce said negative high voltage.

Certain other embodiments of this invention is to provide a type of liquid crystal display unit that includes a liquid crystal screen and a liquid crystal drive unit;

said liquid crystal screen includes multiple COM electrodes and SEG electrodes;

said liquid crystal drive unit is used to create the driving voltages for the COM electrodes and SEG electrodes of said liquid crystal screen; and said liquid crystal drive unit includes a power source circuit, wherein said power source circuit includes:

a charge pump circuit, used in utilizing the charge pump to create driving voltages for the COM electrodes and SEG electrodes of said liquid crystal screen. Said driving voltages include a positive high voltage, a positive sub-high voltage, a lowest positive high voltage, a zero-potential voltage, and a negative high voltage. Said positive high voltage and said negative high voltage, as well as said positive sub-high voltage and said zero-potential voltage are separately symmetrical with respect to said lowest positive high voltage;

a first control circuit, used in the closed-loop control of said charge pump circuit to produce said positive high voltage;

a bias-ratio circuit used in accordance with the positive high voltage and the zero-potential voltage produced by said first control circuit to produce said positive sub-high voltage and the lowest positive high voltage; and a second control circuit, used in accordance with the positive sub-high voltage and the lowest positive high voltage produced by said bias-ratio circuit in the closed-loop control of said charge pump circuit to produce said negative high voltage.

Still certain other embodiments of this invention is to provide a type of boost circuit, wherein said boost circuit includes:

a charge pump circuit, used in utilizing the charge pump to create positive high voltage; and a control circuit, used in the closed-loop control of said charge pump circuit to produce high voltage in accordance with an external voltage.

In the embodiments of this invention, through the control circuit's closed-loop control of the conductivity and nonconductivity of the charge pump circuit's on-off switches, stable highest positive and highest negative liquid crystal drive voltages are directly produced by controlling the charge pump circuit. The system does not contain any voltage higher than the liquid crystal drive voltages, nor does it contain any voltage lower than the highest negative liquid crystal drive voltage, thereby reducing power consumption, and leading to a simple, easily realized structure, while also ensuring the consistency and symmetry of the positive and negative voltages.

While the present invention has been described with reference to certain preferred embodiments, it is to be understood that the present invention is not limited to such specific embodiments. Rather, it is the inventor's contention that the invention be understood and construed in its broadest meaning as reflected by the following claims. Thus, these claims are to be understood as incorporating not only the preferred embodiments described herein but also all those other and further alterations and modifications as would be apparent to those of ordinary skilled in the art.

We claim:

1. A power source circuit for driving an electronic display comprising:

a charge pump circuit for generating a positive high voltage ("VH") and a negative high voltage ("VL");

a first control circuit for closed-loop control of the charge pump circuit to adjust the positive high voltage;

a bias-ratio circuit, wherein the positive high voltage and a zero-potential voltage ("VSS") are inputted to the bias-ratio circuit to generate a positive sub-high voltage ("VG") and a lowest positive high voltage ("VM"); and a second control circuit for closed-loop control of the charge pump circuit to adjust the negative high voltage, wherein the positive high voltage, the positive sub-high voltage, the lowest positive high voltage, the zero-potential voltage, and the negative high voltage drive the electronic display.

2. The power source circuit of claim 1 wherein the positive high voltage and the negative high voltage are symmetric with respect to the lowest positive high voltage and wherein the positive sub-high voltage and the zero-potential voltage are symmetric with respect to the lowest positive high voltage.

3. The power source circuit of claim 1 wherein the charge pump circuit comprises a plurality of sub-circuits and wherein the plurality of sub-circuits serially pumps an input voltage to generate the positive high voltage and the negative high voltage.

4. The power source circuit of claim 3 wherein a first sub-circuit of the plurality of sub-circuits comprises:

a first transistor;
a second transistor;
a third transistor;
a fourth transistor;
a first capacitor; and
a second capacitor, wherein the first transistor, the second transistor, and the second capacitor are sequentially connected in series, wherein the third transistor and the fourth transistor are serially connected, wherein the first capacitor has a first terminal connected to the serial connection of the first transistor and the second transistor and a second terminal connected to the serial connection of the third transistor and the fourth transistor, wherein the input voltage and the zero-potential voltage are applied across the serial connection of the first transistor, the second transistor, and the second capacitor, wherein the input voltage and the zero-potential voltage are applied across the serial connection of the third transistor and the fourth transistor, and wherein an output voltage is generated at a terminal of the second capacitor and the output voltage is a scalar factor of the input voltage.

5. The power source circuit of claim 4 wherein each of the plurality of sub-circuits comprises identical components and connections to the first sub-circuit.

6. The power source circuit of claim 1 wherein the first control circuit comprises:

a resistance voltage division circuit, wherein the positive high voltage and the zero-potential voltage are applied across the resistance voltage division circuit to generate a divided voltage ("Vr");

a reference voltage production circuit for producing a reference voltage ("Vref");

an error-ratio gauge, wherein the error-ratio gauge outputs an enabling trigger signal as a function of the divided voltage and the reference voltage; and a D trigger sampling circuit, wherein the D trigger sampling circuit receives the enabling trigger signal as input and outputs an enabling signal to the charge pump circuit for controlling the magnitude of the positive high voltage.

7. The power source circuit of claim 6 wherein the resistance voltage division circuit comprises a first resistor having a resistance R2 and a second resistor having a resistance Rx2, wherein the first resistor and the second resistor are connected in series, and wherein the divided voltage is generated at the connection between the first resistor and the second resistor.

8. The power source circuit of claim 7 wherein the positive high voltage is given by VH=Vref*(R2+Rx2)/Rx2.

9. The power source circuit of claim 1 wherein the bias-ratio circuit comprises a first resistor;
a second resistor; and
a third resistor,
wherein a first terminal of the first resistor is connected to the positive high voltage,
wherein a second terminal of the first resistor is connected to a first terminal of the second resistor,
wherein a second terminal of the second resistor is connected to a first terminal of the third resistor, and
wherein a second terminal of the third resistor is connected to the zero-potential voltage.

10. The power source circuit of claim 1 wherein the second control circuit comprises:
a resistance voltage division circuit, wherein the positive high voltage and the zero-potential voltage are applied across the resistance voltage division circuit to generate a divided voltage ("VMX");
an error-ratio gauge, wherein the error-ratio gauge outputs an enabling trigger signal as a function of the divided voltage and the lowest positive high voltage; and
a D trigger sampling circuit, wherein the D trigger sampling circuit receives the enabling trigger signal as input and outputs an enabling signal to the charge pump circuit for controlling the magnitude of the negative high voltage.

11. The power source circuit of claim 10 wherein
if the divided voltage is greater than the lowest positive high voltage,
the charge pump circuit performs discharge or charge, else,
the charge pump circuit does not perform discharge or charge.

12. The power source circuit of claim 10 wherein the resistance voltage division circuit comprises a first resistor and a second resistor, wherein the first resistor and the second resistor are connected in series, and wherein the divided voltage is at the connection between the first resistor and the second resistor.

13. A power source circuit for driving an electronic display comprising:
a charge pump circuit for generating a positive high voltage ("VH") and a negative high voltage ("VL"), wherein the charge pump circuit comprises a plurality of sub-circuits and wherein the plurality of sub-circuits serially pumps an input voltage to generate the positive high voltage and the negative high voltage;
a first control circuit for closed-loop control of the charge pump circuit to adjust the positive high voltage, wherein the first control circuit comprises:
a first resistance voltage division circuit, wherein the positive high voltage and the zero-potential voltage are applied across the first resistance voltage division circuit to generate a first divided voltage ("Vr");
a first reference voltage production circuit for producing a reference voltage ("Vref");
a first error-ratio gauge, wherein the first error-ratio gauge outputs a first enabling trigger signal as a function of the first divided voltage and the reference voltage; and
a first D trigger sampling circuit, wherein the first D trigger sampling circuit receives the first enabling trigger signal as input and outputs a first voltage enabling signal to the charge pump circuit for controlling the magnitude of the positive high voltage;
a bias-ratio circuit, wherein the positive high voltage and a zero-potential voltage ("VSS") are inputted to the bias-ratio circuit to generate a positive sub-high voltage ("VG") and a lowest positive high voltage ("VM"); and
a second control circuit for closed-loop control of the charge pump circuit to adjust the negative high voltage, wherein the second control circuit comprises:
a second resistance voltage division circuit, wherein the positive high voltage and the zero-potential voltage are applied across the second resistance voltage division circuit to generate a second divided voltage ("VMX");
a second error-ratio gauge, wherein the second error-ratio gauge outputs a second enabling trigger signal as a function of the second divided voltage and the lowest positive high voltage; and
a second D trigger sampling circuit, wherein the second D trigger sampling circuit receives the second enabling trigger signal as input and outputs a second voltage enabling signal to the charge pump circuit for controlling the magnitude of the negative high voltage,
wherein the positive high voltage, the positive sub-high voltage, the lowest positive high voltage, the zero-potential voltage, and the negative high voltage drive the electronic display, wherein the positive high voltage and the negative high voltage are symmetric with respect to the lowest positive high voltage and
wherein the positive sub-high voltage and the zero-potential voltage are symmetric with respect to the lowest positive high voltage.

14. The power source circuit of claim 13 wherein a first sub-circuit of the plurality of sub-circuits comprises:
a first transistor;
a second transistor;
a third transistor;
a fourth transistor;
a first capacitor; and
a second capacitor,
wherein the first transistor, the second transistor, and the second capacitor are sequentially connected in series,
wherein the third transistor and the fourth transistor are serially connected,
wherein the first capacitor has a first terminal connected to the serial connection of the first transistor and the second transistor and a second terminal connected to the serial connection of the third transistor and the fourth transistor,
wherein the input voltage and the zero-potential voltage are applied across the serial connection of the first transistor, the second transistor, and the second capacitor,
wherein the input voltage and the zero-potential voltage are applied across the serial connection of the third transistor and the fourth transistor, and
wherein an output voltage is generated at a terminal of the second capacitor and the output voltage is a scalar factor of the input voltage.

15. The power source circuit of claim 14 wherein each of the plurality of sub-circuits comprises identical components and connections to the first sub-circuit.

16. The power source circuit of claim 13 wherein the first resistance voltage division circuit comprises a first resistor having a resistance R2 and a second resistor having a resistance Rx2, wherein the first resistor and the second resistor are connected in series, and wherein the divided voltage is generated at the connection between the first resistor and the second resistor.

17. The power source circuit of claim 16 wherein the positive high voltage is given by VH=Vref*(R2+Rx2)/Rx2.

18. The power source circuit of claim 13 wherein the bias-ratio circuit comprises
a first resistor,
a second resistor, and
a third resistor,
wherein a first terminal of the first resistor is connected to the positive high voltage,
wherein a second terminal of the first resistor is connected to a first terminal of the second resistor,
wherein a second terminal of the second resistor is connected to a first terminal of the third resistor, and
wherein a second terminal of the third resistor is connected to the zero-potential voltage.

19. The power source circuit of claim 13 wherein
if the second divided voltage is greater than the lowest positive high voltage,
the charge pump circuit performs discharge or charge, else,
the charge pump circuit does not perform discharge or charge.

20. The power source circuit of claim 13 wherein the second resistance voltage division circuit comprises a first resistor and a second resistor, wherein the first resistor and the second resistor are connected in series, and wherein the divided voltage is at the connection between the first resistor and the second resistor.

* * * * *